(12) United States Patent
Watanabe et al.

(10) Patent No.: US 9,499,111 B2
(45) Date of Patent: Nov. 22, 2016

(54) FRONT VEHICLE-BODY STRUCTURE OF VEHICLE

(71) Applicant: MAZDA MOTOR CORPORATION, Hiroshima (JP)

(72) Inventors: Shigeaki Watanabe, Hiroshima (JP); Takehiro Kamei, Hiroshima (JP); Mitsuru Wakabayashi, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/829,159

(22) Filed: Aug. 18, 2015

(65) Prior Publication Data
US 2016/0059810 A1 Mar. 3, 2016

(30) Foreign Application Priority Data

Aug. 29, 2014 (JP) ................................. 2014-174674

(51) Int. Cl.
| | |
|---|---|
| *B60R 19/24* | (2006.01) |
| *B60R 19/34* | (2006.01) |
| *B62D 21/15* | (2006.01) |
| *B62D 25/08* | (2006.01) |

(52) U.S. Cl.
CPC ............. *B60R 19/24* (2013.01); *B62D 21/152* (2013.01); *B62D 25/082* (2013.01); *B60R 2019/247* (2013.01)

(58) Field of Classification Search
CPC ............ B60R 19/34; B60R 2019/247; B62D 25/082; B62D 21/152
USPC .......... 293/133; 296/203.01, 203.02, 187.09, 296/187.1
See application file for complete search history.

(56) References Cited

U.S. PATENT DOCUMENTS

| | | | |
|---|---|---|---|
| 8,496,287 B2* | 7/2013 | Matsuura | B60R 19/34 293/132 |
| 2016/0039373 A1* | 2/2016 | Yamada | B60R 19/24 293/132 |
| 2016/0046250 A1* | 2/2016 | Sotoyama | B62D 21/152 293/155 |

FOREIGN PATENT DOCUMENTS

| | | |
|---|---|---|
| JP | H07-187003 A | 7/1995 |
| JP | 2009-248603 A | 10/2009 |
| JP | 2010-070038 A | 4/2010 |
| JP | 2011-255815 A | 12/2011 |
| JP | 2013-199233 A | 10/2013 |

* cited by examiner

*Primary Examiner* — Dennis H Pedder
(74) *Attorney, Agent, or Firm* — Studebaker & Brackett PC

(57) ABSTRACT

There are provided an outside crash can provided on an outward side of an inside crash can, extending obliquely forward and outward from a front-end side middle portion of the front side frame and connecting to an outward end portion of a bumper reinforcement and a second set plate connecting the inside crash can and the outside crash can to the front side frame. The second set plate includes a middle wall extending longitudinally, a front end wall extending inward from a front end of the middle wall, and a rear end wall extending outward from a rear end of the middle wall, a rear end-side portion of the inside crash can is connected to the front and rear end walls, and a rear-end side portion of the outside crash can is connected to the middle and rear end walls.

11 Claims, 10 Drawing Sheets

FRONT VEHICLE-BODY STRUCTURE OF VEHICLE

BACKGROUND OF THE INVENTION

The present invention relates to a front vehicle-body structure of a vehicle, and in particular, relates to the front vehicle-body structure of the vehicle comprising a pair of inside crash cans supporting a bumper reinforcement and a pair of outside crash cans provided on an outward side, in a vehicle width direction, of the pair of inside crash cans.

Conventionally, a technology for reducing an impact energy against a passenger in a vehicle frontal collision, in which a pair of right-and-left cylindrical crash cans are provided between respective front end portions of a pair of right-and-left front side frames extending in a vehicle longitudinal direction and a bumper reinforcement extending in a vehicle width direction, and the above-described crash cans are configured to have buckling (crush) deformation in a direction of its axial center in an initial stage of the collision, whereby the impact energy in the collision's initial stage can be absorbed, is known.

In general, the above-described crash cans are attached to respective front end portions of the pair of right-and-left front side frames via a pair of right-and-left set plates. Each of the pair of right-and-left set plates comprises two plates. Herein, one of these two plates which is located on the side of a bumper and connected to a rear end portion of the crash can, i.e., a bumper-side set plate, is fastened to the other plate which is located on the side of a vehicle body and connected to the front end portion of the front side frame, i.e., a vehicle-body-side set plate with bolts which are arranged longitudinally. Accordingly, the crash can which has got broken in a low-speed vehicle collision or the like is replaceable by a new one by removing the bolts, so that the reparability can be ensured.

Meanwhile, the above-described structure in which the bumper-side set plate is fixedly fastened to vehicle-body-side set plate with bolts, i.e., the cantilever structure of supporting at a so-called joint face, has a problem in that since the bumper reinforcement having a heavy weight and the crash cans tend to easily vibrate vertically which are caused by traveling vibrations of the vehicle, the NVH (Noise Vibration Harshness) performance of the vehicle body may decrease improperly, so that the passenger's habitability in a vehicle compartment may deteriorate. Accordingly, various technologies to improve the NVH performance by changing the natural frequency of a vehicle-body front portion have been proposed.

In a front vehicle-body structure of a vehicle disclosed in Japanese Patent Laid-Open Publication No. 2011-255815, there are provided a first set plate which is connected to a front end portion of a front side frame and a second set plate which is connected to a rear end portion of a crash can and capable of being fastened to the first set plate with bolts, and the first and second set plates respectively have a rigid joint portion where protrusion portions thereof are contacted and bolt-fastened to each other and a flexible joint portion where they are joined to each other via a damping member.

In the vehicle frontal collision, the impact energy acts on a vehicle-body portion on the outward side, in the vehicle width direction, of the front side frame. In this small-overlap collision (hereafter, referred to as "SOL collision"), the transmission efficiency of the impact energy to the front side frame decreases, compared to a collision case in which a collision object and the front side frame overlap each other, so that the amount of the impact energy's absorption which is caused by deformation of the front side frame decreases, and the impact energy transmitted to the vehicle-body side increases accordingly. Therefore, in order to increase the amount of the impact energy's absorption, taking measures of the SOL collision, an outside crash can is newly provided on the outward side, in the vehicle width direction, of the existing crash can (hereafter, referred to as the "inside crash can").

According to the above-described front vehicle-body structure of the vehicle of the patent document, the properly-high joint force can be maintained by the rigid joint portion and also the vibration energy can be properly absorbed as the strain (distortion) energy by the flexible joint portion. However, this front vehicle-body structure of the vehicle of the patent document has a problem in that additional forming processes for forming storage portions to store the protrusion portions and the damping member therein at both the first and second set plates become necessary and also the parts number increases because of an addition of the damping member, so that there still exists a room for improvement in the productively.

Further, in a case in which the above-described outside crash can is newly provided for countermeasures of the SOL collision, the first and second set plates for attaching the outside crash can become necessary, and also forming processes and the damping member for the outside crash can increase, in addition to the above-described increase for the inside crash can, so that there is a concern that the productivity further deteriorates.

SUMMARY OF THE INVENTION

Accordingly, an object of the present invention is to provide a front vehicle-body structure of a vehicle which can properly improve both the NVH performance and the productivity, ensuring the reparability of the crash can.

The present invention is a front vehicle-body structure of a vehicle, comprising a bumper reinforcement extending in a vehicle width direction, a pair of right-and-left front side frames supporting the bumper reinforcement via a pair of right-and-left inside crash cans, a pair of right-and-left outside crash cans respectively provided on an outward side, in a vehicle width direction, of the pair of inside crash cans, the pair of outside crash cans being configured to respectively extend obliquely forward and outward from respective front-end side middle portions of the pair of front side frames and connect to respective outward end portions, in the vehicle width direction, of the bumper reinforcement, and a pair of right-and-left set plates provided to respectively connect the pair of inside crash cans and the pair of outside crash cans to the pair of front side frames, wherein each of the pair of set plates includes a set-plate middle wall which extends in a vehicle longitudinal direction, a set-plate front end wall which extends inward from a front end of the set-plate middle wall, and a set-plate rear end wall which extends outward from a rear end of the set-plate middle wall, a rear end-side portion of the inside crash can is connected to the set-plate front end wall and the set-plate rear end wall, and a rear-end side portion of the outside crash can is connected to the set-plate middle wall and the set-plate rear end wall.

According to the present invention, since there is provided the set plate to connect the inside crash can and the outside crash can to the front side frame, the reparability and the productivity of the inside crash can and the outside crash can in a light vehicle collision can be ensured. Further, since the rear-end side portion of the inside crash can is connected to the set-plate front end wall and the set-plate rear end wall, the longitudinal length of a joint area can be ensured, so that the support strength of the inside crash can can be increased. Since the rear-end side portion of the outside crash can is connected to the set-plate middle wall and the set-plate rear end wall, the longitudinal length of a joint area can be ensured, so that the support strength of the outside crash can can be increased.

In an embodiment of the present invention, the above-described front vehicle-body structure further comprises a pair of right-and-left apron reinforcements respectively provided above and outward of the pair of front side frames, and a pair of right-and-left connecting frames provided to respectively connect respective outward end portions, in the vehicle width direction, of the pair of front side frames and the pair of apron reinforcements, wherein the set-plate rear end wall is connected to a front end portion of the connecting frame. According to this embodiment, since the support strength of the set plate can be increased by using the connecting frame, the support strength of the inside crash can and the outside crash can can be further increased.

In another embodiment of the present invention, the front side frame includes a panel-shaped outer panel and an inner panel having a hat-shaped cross section, the outer and inner panels forming a closed cross section together therewith, and the set-plate middle wall forms a front-end side portion of the outer panel. According to this embodiment, since the impact energy in the vehicle frontal collision can be directly transmitted from the set plate to a front end portion of the outer panel, having the shortest distance, the transmission efficiency of the impact energy can be improved.

In another embodiment of the present invention, a connecting member which connects the set-plate rear end wall to the front side frame is provided in a closed cross section of the connecting frame. According to this embodiment, the second path where the impact energy inputted to the outside crash can is transmitted to the front side frame via the connecting member can be provided.

In another embodiment of the present invention, an outside wall portion of the outside crash can and the connecting member are arranged substantially straightly in a plan view. According to this embodiment, the second path where the impact energy inputted to the outside crash can is straightly transmitted to the front side frame, having the shortest transmission distance, can be provided.

In another embodiment of the present invention, the connecting member is configured such that a vertical width thereof becomes greater toward a rear side thereof in a side view. According to this embodiment, the transmission efficiency of the impact energy to the front side frame can be improved by dispersing the impact energy properly.

In another embodiment of the present invention, the inside crash can is configured such that four protrusion portions extending longitudinally are formed at upper, lower, inward, and outward side-face portions thereof so as to have a cross section formed in a roughly cross shape, the outside crash can is configured to have a cross section formed in a roughly rectangular shape such that a vertical width thereof becomes smaller toward a rear side thereof in a side view, and a rear-end side portion of the outside crash can is connected to the protrusion portion formed at the outward side-face, in the vehicle width direction, of the inside crash can. According to this embodiment, since the inside crash can is configured to have the cross section formed in the roughly cross shape by the four protrusion portions extending longitudinally and formed at the upper, lower, inward, and outward side-face portions, the impact energy is properly transmitted to the inside crash can regardless of a manner of collision, so that the uniform axial-compressive deformation by the inside crash can can be attained. Further, since the outside crash can is configured to have the cross section formed in the roughly rectangular shape such that its vertical width becomes smaller toward its rear side in the side view and its rear-end side portion is connected to the protrusion portion formed at the outward side-face, in the vehicle width direction, of the inside crash can, the impact energy inputted to the outside crash can can be converged to the protrusion portion having the high rigidity, and the converged impact energy can be transmitted to the front side frame via the protrusion portion.

In another embodiment of the present invention, there is provided a connecting member which connects the set-plate rear end wall and the front side frame, and the connecting member is configured such that a vertical width of a front-end side portion thereof is substantially equal to a vertical width of the rear-end side portion of the outside crash can. According to this embodiment, the impact energy inputted to the outside crash can can be dispersed and transmitted through the first path where the impact energy is transmitted to the front side frame via the protrusion portion and the second path where the impact energy is transmitted to the front side frame via the connecting member, so that the transmission efficiency of the impact energy can be further improved.

Other features, aspects, and advantages of the present invention will become apparent from the following description which refers to the accompanying drawings.

DETAILED DESCRIPTION OF THE INVENTION

Figure 1:
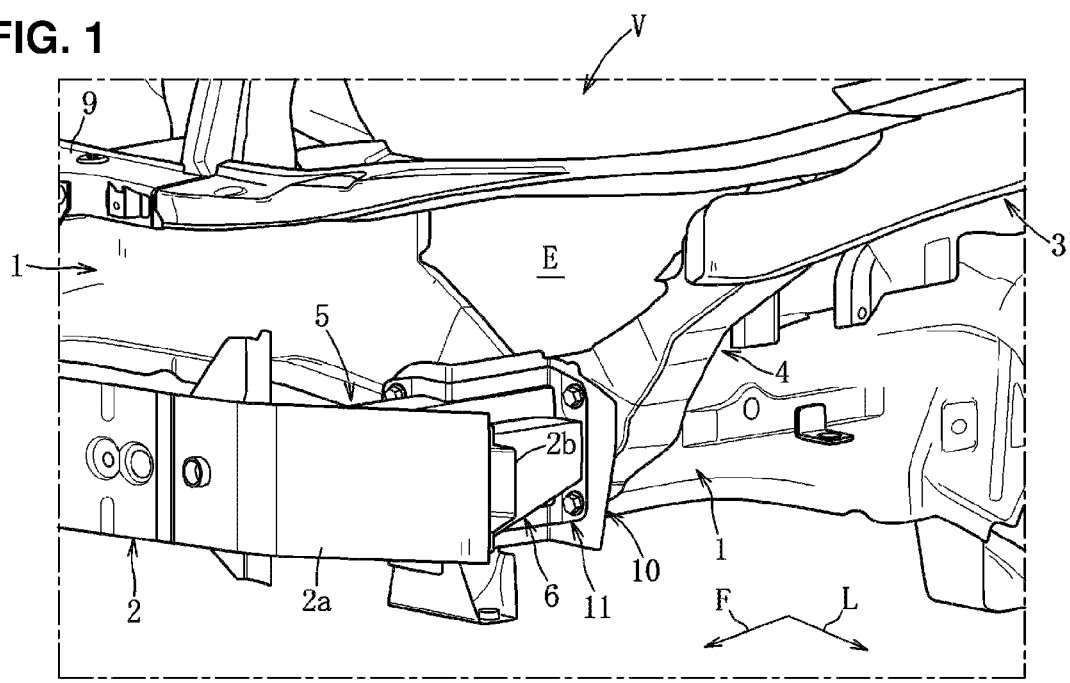
FIG. 1 is a perspective view of a front vehicle-body structure according to an embodiment of the present invention, when viewed from the forward and left side of a vehicle.

Hereafter, an embodiment of the present invention will be described specifically referring to the drawings. The following descriptions exemplify the present invention which is applied to a vehicle, and the present invention, its application, or its use should not be limited the following descriptions.

Figure 2:
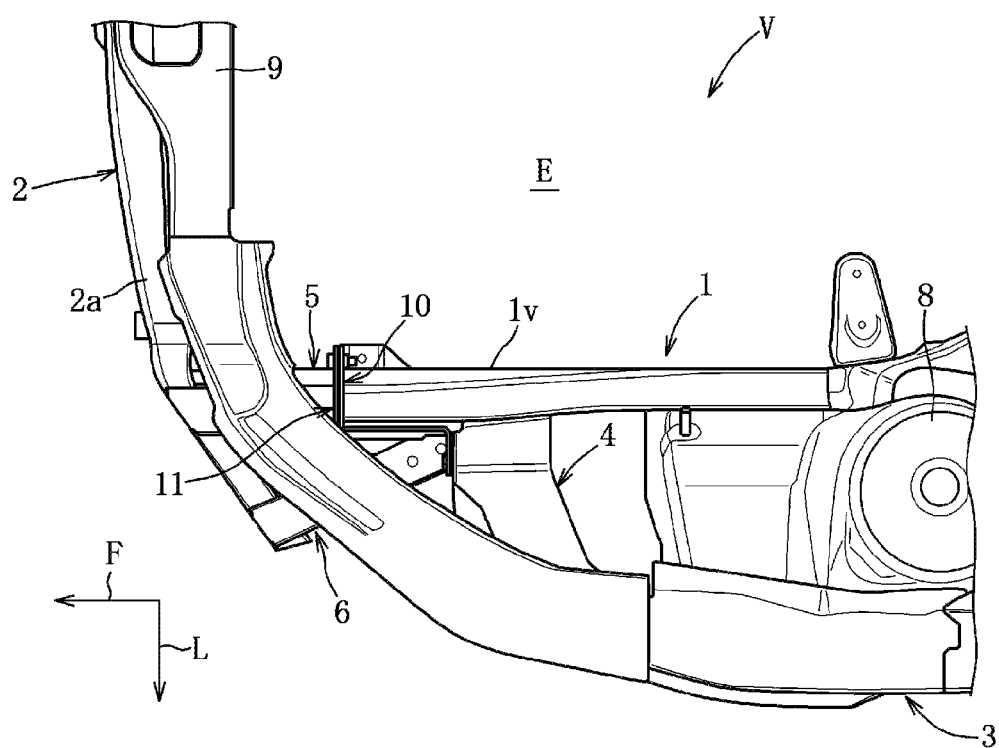
FIG. 2 is a plan view.
Figure 3:
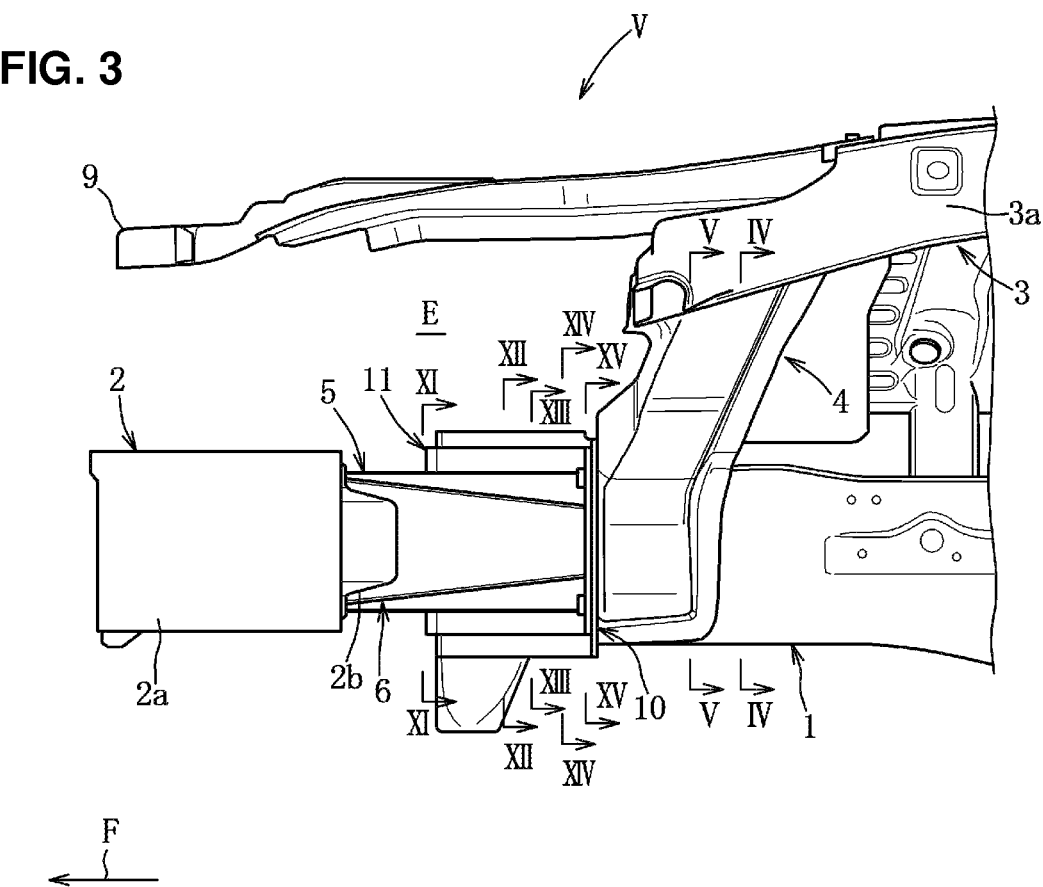
FIG. 3 is a side view.
Figure 4:
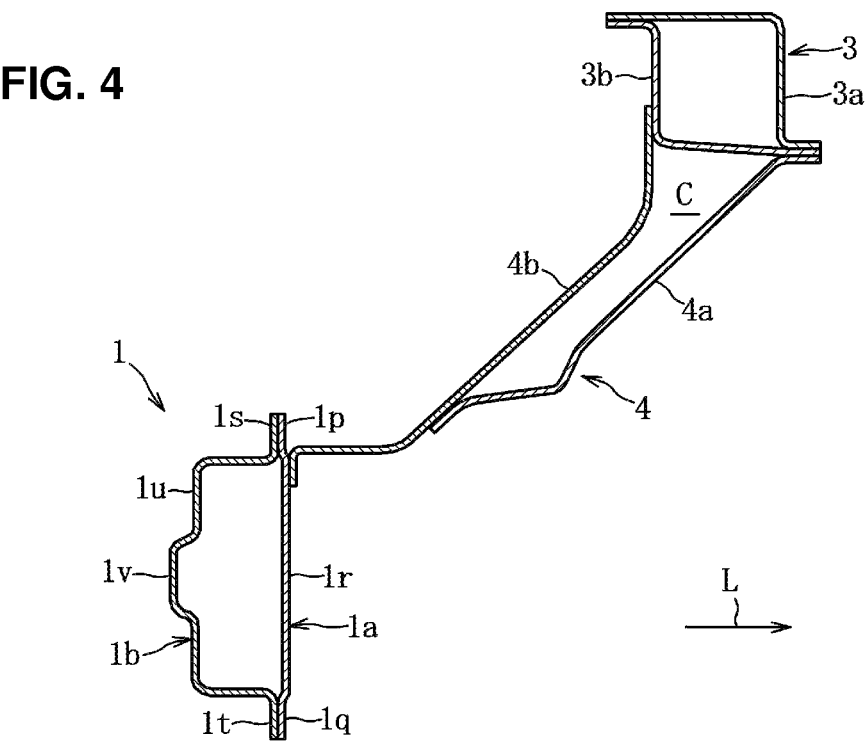
FIG. 4 is a sectional view taken along line IV-IV of FIG. 3.
Figure 5:
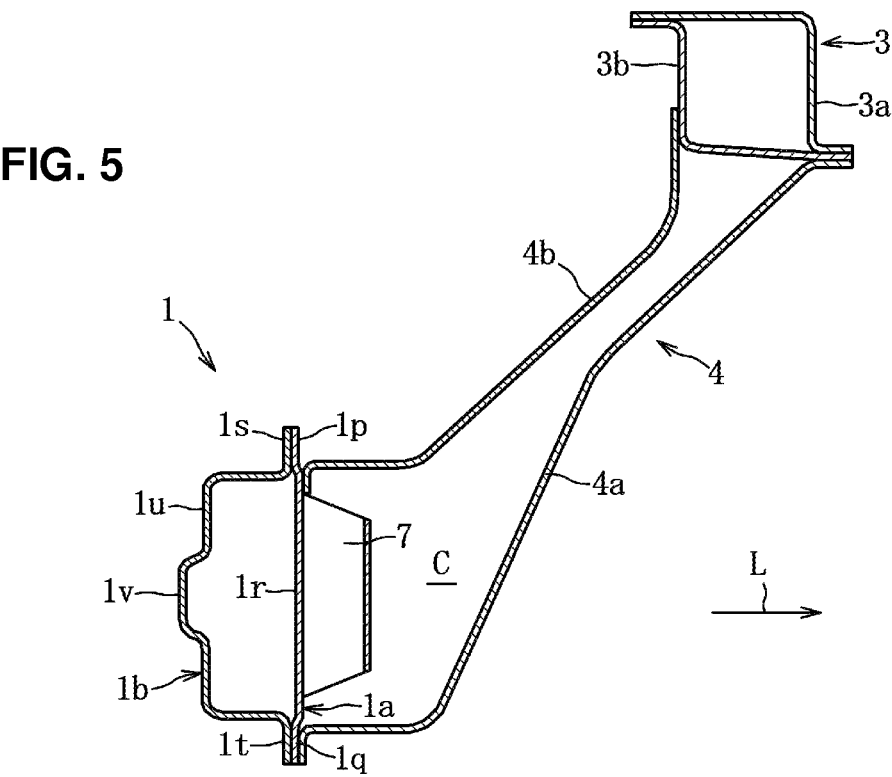
FIG. 5 is a sectional view taken along line V-V of FIG. 3.

The present embodiment will be described referring to FIGS. 1-16. As shown in FIGS. 1-3, a vehicle V comprises a pair of right-and-left front side frames 1 which are arranged forward of a dash panel (not illustrated) longitudinally partitioning a vehicle compartment from an engine room E, a bumper reinforcement 2 which is supported at front end portions of the pair of front side frame 1 via a pair of right-and-left inside crash cans 5, a pair of right-and-left apron reinforcements 3 which are respectively provided above and outward of the pair of front side frames 1, a pair of right-and-left connecting frames 4 which respectively connect the pair of front side frames 1 and the pair of apron reinforcements 3, a pair of right-and-left outside crash cans 6 which are respectively provided on an outward side, in a vehicle width direction, of the pair of inside crash cans 5, and others. Herein, since the above-descried pairs of members are symmetrical, each left-side member will be described mainly. In the drawings, an arrow F shows a forward direction and an arrow L shows a leftward direction.

The front side frames 1 will be described first. The pair of front side frames 1 are arranged to respectively extend longitudinally at right and left portions of the engine room E in front of the dash panel partitioning a front end of the vehicle compartment. Each of the pair of front side frames 1 extends rearward roughly horizontally from a front-end side position of the vehicle V, and its rear-end side middle portion of its rear-end side is joined to a vertical wall portion of the dash panel and its rear-end side portion extends obliquely rearward and downward along a lower face of a floor panel (not illustrated) and is joined to a slant portion of the dash panel. The respective rear-end side portions of the front side frame 1 are joined to the dash panel.

Figure 8:
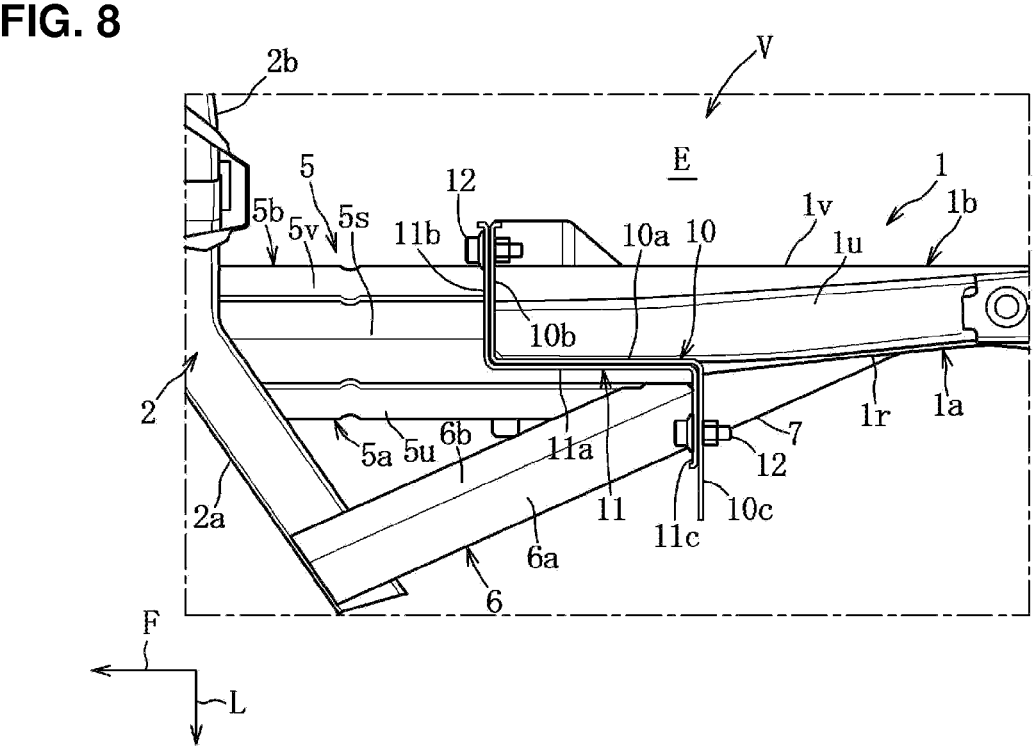
FIG. 8 is a major-part plan view of FIG. 7.

As shown in FIGS. 1-6, the front side frame 1 comprises a left-side outer panel 1a and a right-side inner panel 1b which has a longer longitudinal length than the outer panel 1a. The both panels 1a, 1b are made of a high-tension steel plate through pressing (press working). The outer panel 1a includes an outer upper flange portion 1p at its upper-end side portion, an outer lower flange portion 1q at its lower-end side portion, and an outer panel body portion 1r at a middle position of these flange portions 1p, 1q, the outer panel body portion 1r being configured to protrude slightly leftward and have a roughly-U shaped cross section. The inner panel 1b includes an inner upper flange portion 1s at its upper-end side portion, an inner lower flange portion 1t at its lower-end side portion, an inner panel body portion 1u at a middle position of these flange portions 1s, 1u, the inner panel body portion 1u being configured to protrude rightward and have a roughly-U shaped cross section, and an inner panel body portion 1v which is configured to protrude rightward from a middle stage position of the inner panel body portion 1u and have a roughly-U shaped cross section. As shown in FIGS. 2 and 8, the protrusion portion 1v extends longitudinally and protrudes rightward such that the mount of protrusion becomes smaller toward the rear side.

The outer panel 1a and the inner panel 1b are joined together over a range from a first front-end side middle portion to a rear-end side middle portion (the vertical wall portion of the dash panel) such that the upper flange portions 1p, 1s are spot-welded to each other and the lower flange portions 1q, 1t are spot-welded to each other. Accordingly, the front side frame 1 is configured such that a convex closed cross section is formed by the outer panel 1a and the inner panel 1b in an area from the first front-end side middle portion to a second front-end side middle portion which is located in back of the first front-end side middle portion (see FIGS. 4 and 5), and a roughly-rectangular closed cross section is formed by the outer panel 1a and the inner panel 1b in an area from the second front-end side middle portion to the rear-end side middle portion.

As shown in FIGS. 1-3, 6-10, and 16, a first set plate 10 is joined to a front end portion of the front side frame 1 by welding. The first set plate 10 is made of a steel plate having a roughly crank-shaped horizontal section, and includes a middle wall 10a which extends longitudinally, a front end wall 10b which extends rightward from a front end of the middle wall 10a, and a rear end wall 10c which extends leftward from a rear end of the middle wall 10a. The first set plate 10 is configured such that the following relational expression is established.

$$B1 \leq 2 \times A1$$

(wherein A1 represents a longitudinal length of the first set plate 10, and B1 represents a lateral length of the first set plate 10)

Thereby, the longitudinal length of the joint area can be properly long, so that the support strength of the inside crash can 5 and the outside crash can 6 can be increased considerably.

Figure 6:
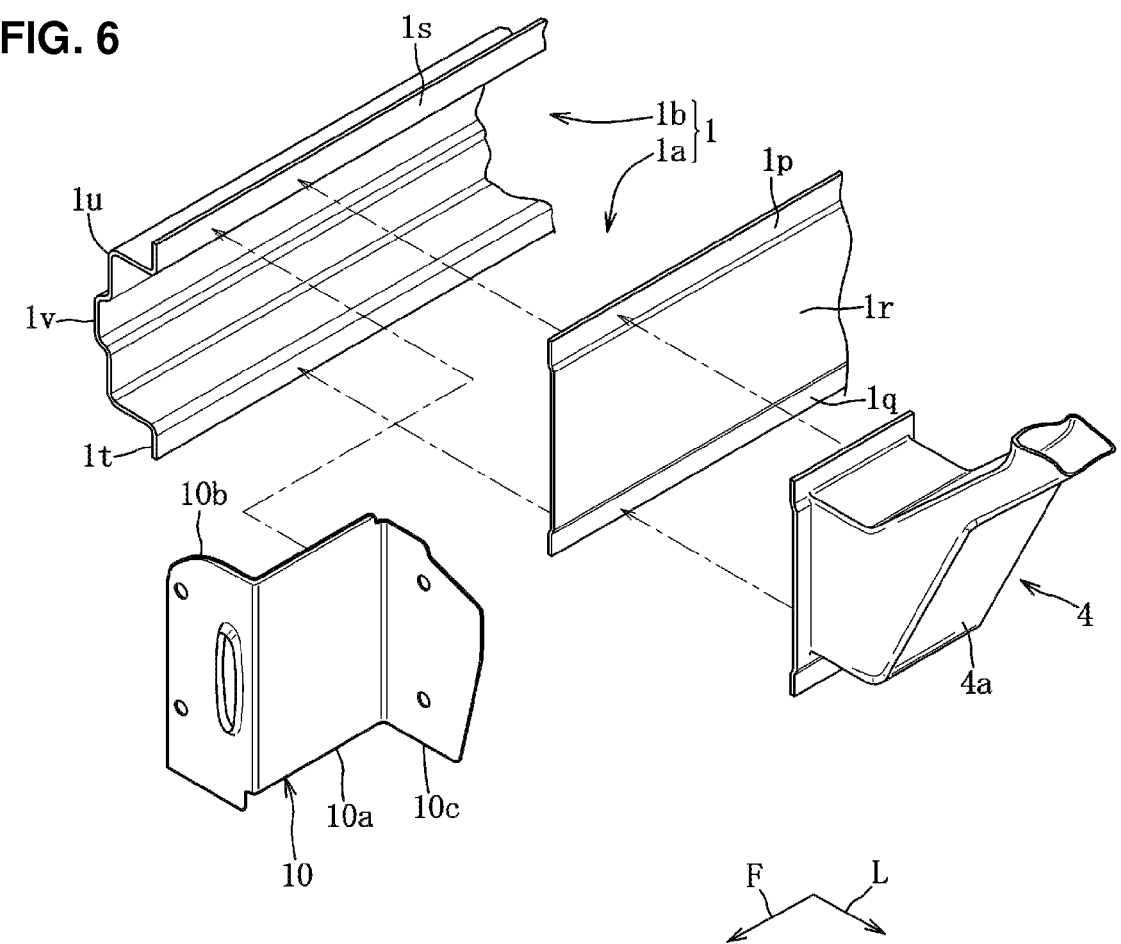
FIG. 6 is an exploded perspective view of a front side frame, a first set plate, and a connecting frame.

A front end portion of the outer panel body portion 1r contacts a rear end portion of the middle wall 10a such that the outer panel body portion 1r is roughly straightly continuous to the middle wall 10a. That is, as shown in FIG. 6, the middle wall 10a forms an outer panel portion of the front side frame 1 in the area from the front end portion to the first front-end side middle portion of the front side frame 1. The inner upper flange portion 1s and the inner lower flange portion 1t are joined to a right face portion of the middle wall 10a, a front end portion of the inner panel 1b is joined to a rear face portion of the front end wall 10b, and a front end portion of the outer panel 1a is joined to a rear end portion of the middle wall 10a. Accordingly, a sideways convex closed cross section is formed by the middle wall 10a and the inner panel 1b in the area from the front end portion to the first front-end side middle portion of the front side frame 1 (see FIGS. 12-15).

The bumper reinforcement 2 comprises a plate portion 2a which extends in a vehicle width direction and a member portion 2b which extends in the vehicle width direction behind the plate portion 2a and has a hat-shaped cross section. An upper end flange portion and a lower end flange portion of the member portion 2b are joined to a back face portion of the plate portion 2a, thereby forming a closed cross section which extends in the vehicle width direction. The apron reinforcement 3 extends slightly downward, substantially in parallel to the front side frame 1, from a base portion of a front hinge pillar (not illustrated) to a position near a front side of a suspension tower 8.

As shown in FIGS. 1-5, the apron reinforcement 3 has a roughly-rectangular closed cross section, which is formed by an outer panel 3a including an upper wall portion and an outer wall portion and an inner panel 3b including a lower wall portion and an inner wall portion and extends longitudinally. A pair of right-and-left fender panels (not illustrated) are respectively attached to outward portions of the pair of apron reinforcements 3. Respective front end portions of the pair of right-and-left apron reinforcements 3 are interconnected by a shroud member 9 extending in the vehicle width direction, and respective rear end portions of the pair of right-and-left apron reinforcements 3 support the pair of right-and-left suspension towers 8. Each of the pair of right-and-left cylindrical suspension towers 8 is arranged near the dash panel between the front side frame 1 and the apron reinforcement 3.

Next, the connecting frame 4 will be described. As shown in FIGS. 1-6, the connecting frame 4 is configured to extend obliquely forward and downward from the front end portion of the apron reinforcement 3 to the front end portion of the outer panel 1*a*. The connecting frame 4 is configured to be continuous to the apron reinforcement 3, and comprises an outer panel 4*a* and an inner panel 4*b* which form a roughly-rectangular horizontal cross section C. A front face portion of a lower-end side portion of the connecting frame 4 is joined to a rear face portion of the rear end wall 10*c*. Accordingly, there are provided a first path where an impact energy inputted to an outside crash can 6, which will be described later, is transmitted to the front side frame 1 via the first set plate 10 and the second set plate 11 and a third path where the impact energy is transmitted to the apron reinforcement 3 via the connecting frame 4.

A plate-shaped connecting member 7 is arranged in the closed cross section C of the connecting frame 4. As shown in FIGS. 5, 7-9, the connecting member 7 is provided on a rear side of the rear end wall 10*c* at a lower-end side portion of the closed cross section C so as to partially partition the closed cross section C into right and left sides. The connecting member 7 includes a front-end flange portion and a rear-end flange portion. The front-end flange portion is joined to the front wall portion of the outer panel 4*a* and the rear end wall 10*c*, thereby forming a three-layer joint portion. The rear-end flange portion is joined to the outer panel 1*a*, so that the connecting member 7 is arranged such that it extends obliquely forward and leftward in a plan view. The connecting member 7 is configured such that its vertical width becomes greater toward the rear side in the side view, and of a vertically-symmetrical trapezoidal shape. Accordingly, the impact energy inputted to the front-end side portion can be dispersed evenly at the rear-end side portion, so that the dispersion efficiency to the front side frame 1 improves.

Figure 7:
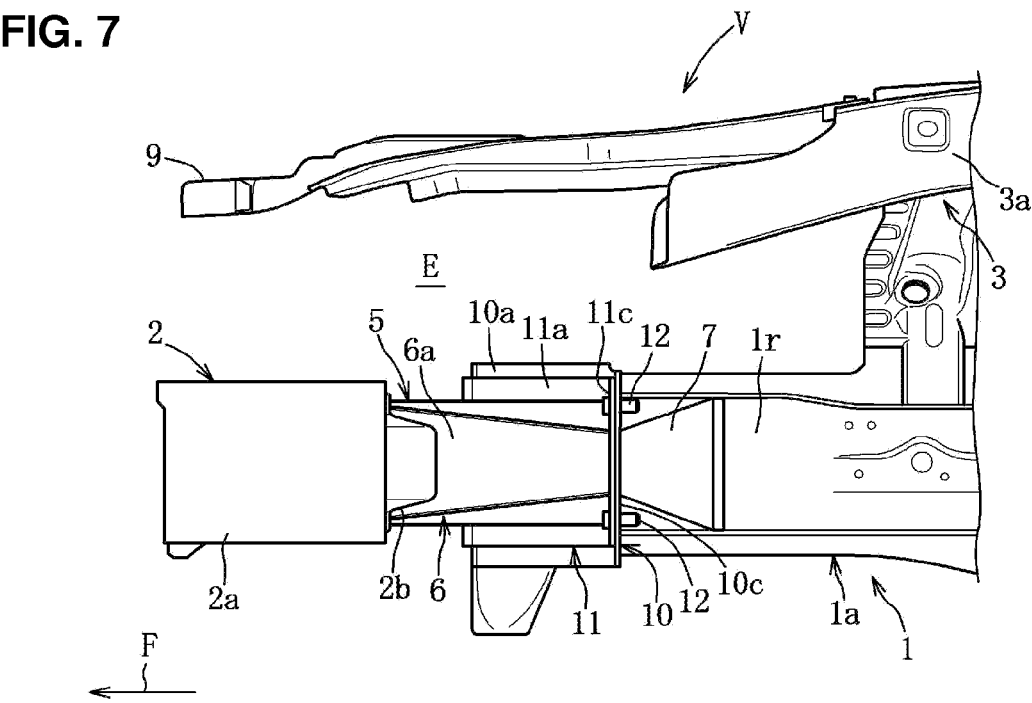
FIG. 7 is a side view, in which the connecting frame is removed.

As shown in FIG. 7, the connecting member 7 is configured such that a vertical width of its front-end side portion is substantially equal to a vertical width of a rear-end side portion of the outside crash can 6, so that the front-end flange portion substantially matches a rear end of a left-side wall portion of an outer panel 6*a* of the outside crash can 6. The connecting member 7 is configured such that a vertical width of its rear-end side portion is substantially equal to a vertical width of the outer panel body portion 1*r*, and upper-and-lower both end portions of the rear-end flange portion respectively match upper-and-lower ridgelines of the outer panel body portion 1*r*. The connecting member 7 is joined by spot welding over the vertical direction.

Figure 9:
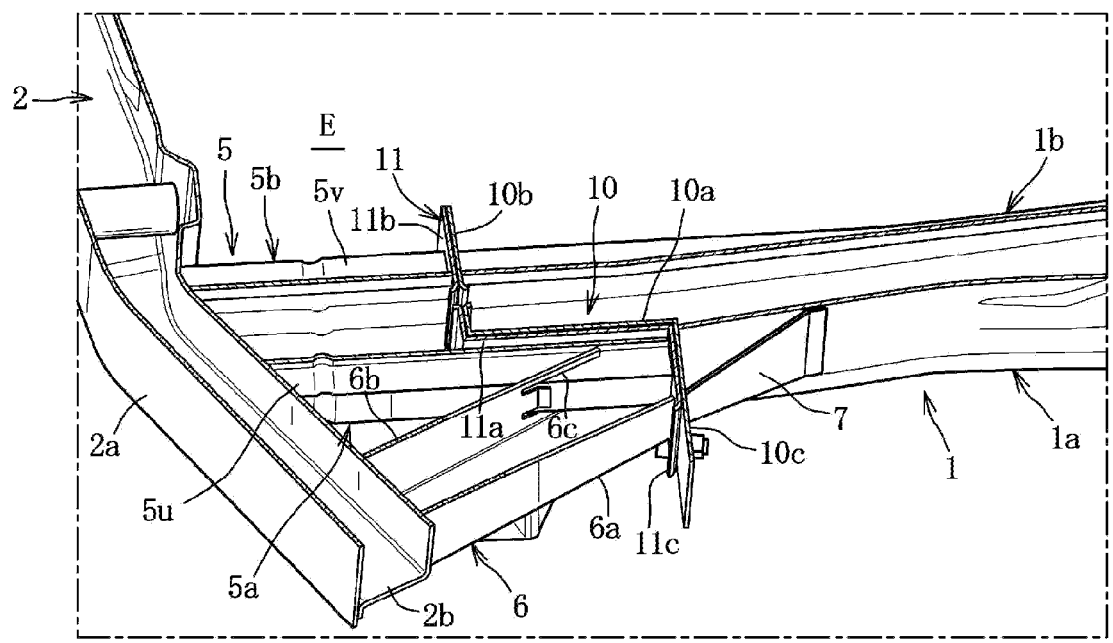
FIG. 9 is a horizontal-sectional perspective view of the major part shown in FIG. 7.
Figure 9:
Figure 11:
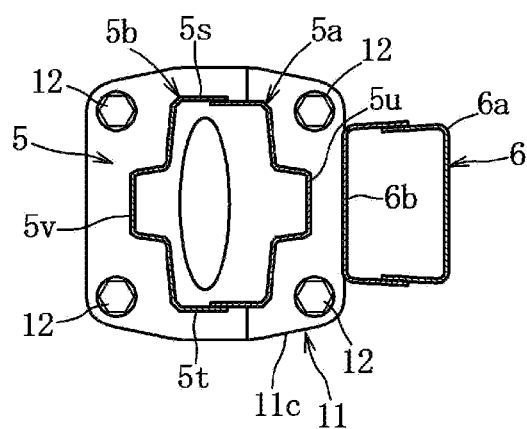
FIG. 11 is a sectional view taken along line XI-XI of FIG. 3.
Figure 12:
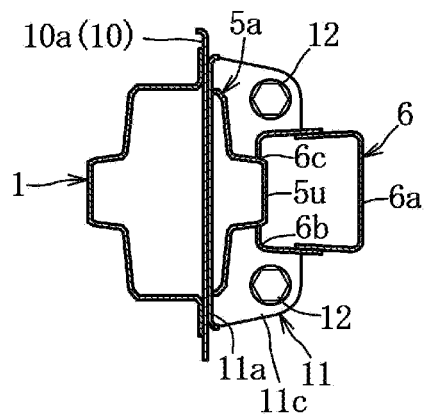
FIG. 12 is a sectional view taken along line XII-XII of FIG. 3.
Figure 13:
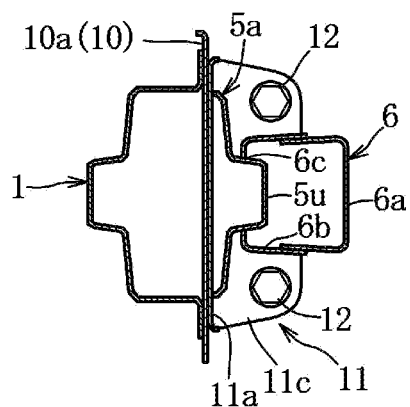
FIG. 13 is a sectional view taken along line XIII-XIII of FIG. 3.
Figure 14:
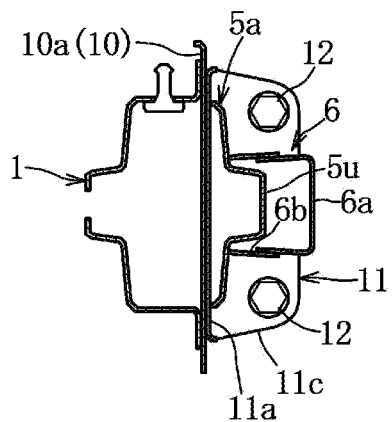
FIG. 14 is a sectional view taken along line XIV-XIV of FIG. 3.

Next, the inside crash can 5 will be described. The inside crash can 5 is connected to a left-side rear portion of the bumper reinforcement 2, and configured to have a specified size and shape which can provide a desired impact-energy absorption performance through its compressive deformation when being crushed by the impact energy inputted via the bumper reinforcement 2. As shown in FIGS. 8, 9 and 11, the inside crash can 5 is configured to extend substantially in parallel to the front side frame 1, and comprises an outer panel 5*a* which is located on the outward side in the vehicle width direction and an inner panel 5*b* which is located on the inward side in the vehicle width direction and has a shorter longitudinal length than the outer panel 5*a*.

The inside crash can 5 is configured such that a top wall portion and a bottom wall portion of the outer panel 5*a* are respectively connected to a top wall portion and a bottom wall portion of the inner panel 5*b*, and four protrusion portions 5*s*-5*v* extending longitudinally are formed at its upper, lower, inward, and outward side-face portions so as to have a cross section formed in a roughly cross shape. A front end portion of the inside crash can 5 is connected to a rear-end side vertical wall portion of the member portion 2*b* such that an axial center of the inside crash can 5 is perpendicular to the member portion 2*b*. Herein, a vertical width of the right-and-left protrusion portions 5*u*, 5*v* is configured to be smaller than a vertical width of a protrusion portion of the member portion 2*b*. Accordingly, the impact energy acting on the bumper reinforcement 2 can be properly transmitted to the inside crash can 5, so that the uniform axial-compressive deformation by the inside crash can 5 can be attained in the vehicle collision.

The inside crash can 5 is configured to have the roughly cross-shaped closed cross section which is formed by the outer panel 5*a* and the inner panel 5*b* in the area from its front end portion to its middle portion which corresponds to the front end portion of the front side frame 1. As shown in FIGS. 12-15, the a sideways convex closed cross section is formed by a middle wall 11*a* of the second set plate 11 and the outer panel 5*a* in an area from the middle portion of the inside crash can 5 to a rear end portion of the inside crash can 5 which corresponds to the first front-end side middle portion of the front side frame 1. Herein, since a sideways convex closed cross section is formed by the middle wall 10*a* and the inner panel 1*b* in an area from the front end portion to the first front-end side middle portion of the front side frame 1, a roughly cross-shaped closed cross section is formed by the outer panel 5*a* and the inner panel 1*b*.

As shown in FIGS. 1-3, 7-16, the second set plate 11 is joined to the rear end portion of the inside crash can 5 by welding. The second set plate 11 is made of a steel plate having a roughly crank-shaped horizontal section, and includes a middle wall 11*a* which extends longitudinally, a front end wall 11*b* which extends rightward from a front end of the middle wall 11*a*, and a rear end wall 11*c* which extends leftward from a rear end of the middle wall 11*a*. The second set plate 11 is configured such that the following relational expression is established.

$$B2 \leq 2 \times A2$$

(wherein A2 represents a longitudinal length of the second set plate 11, and B2 represents a lateral length of the second set plate 11)

Thereby, the longitudinal length of the joint area can be properly long, so that the support strength of the inside crash can 5 and the outside crash can 6 can be increased considerably.

Figure 10:
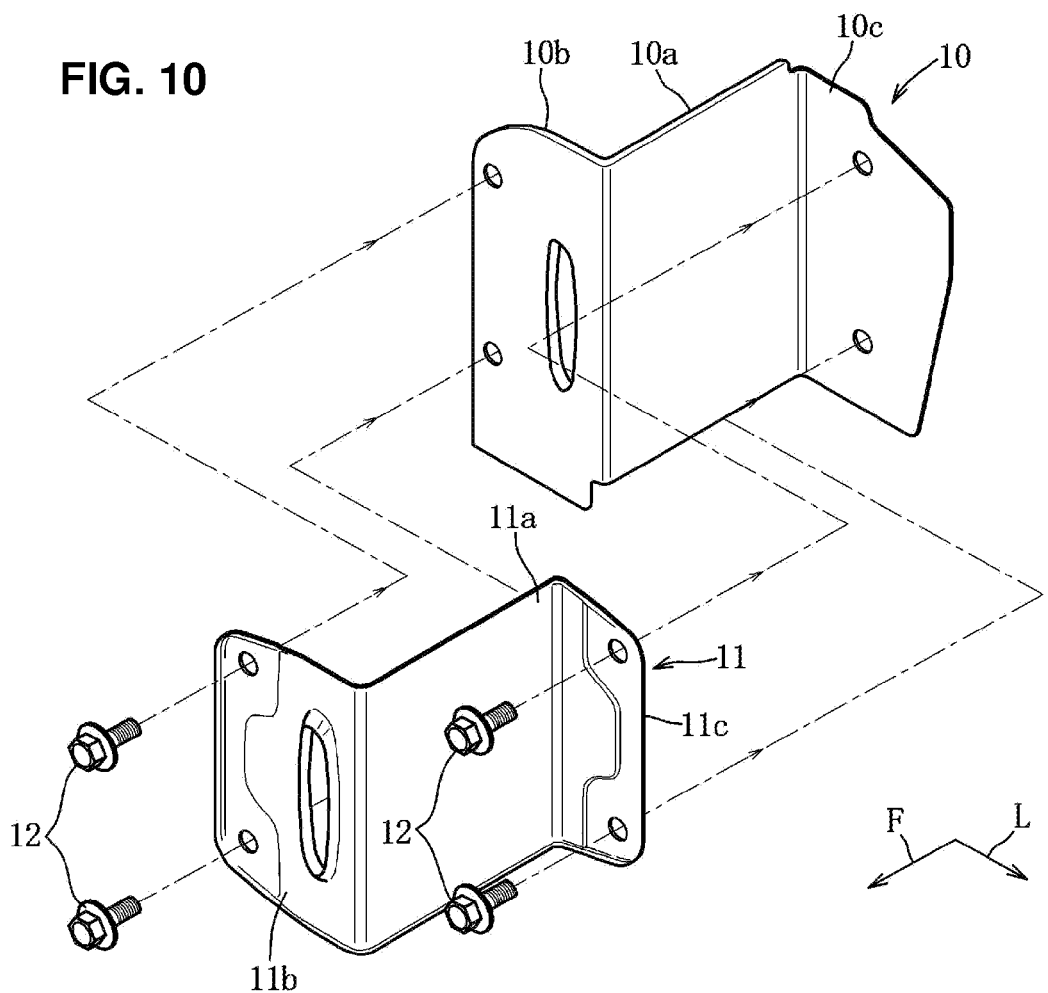
FIG. 10 is an exploded perspective view of first and second set plates.
Figure 16:
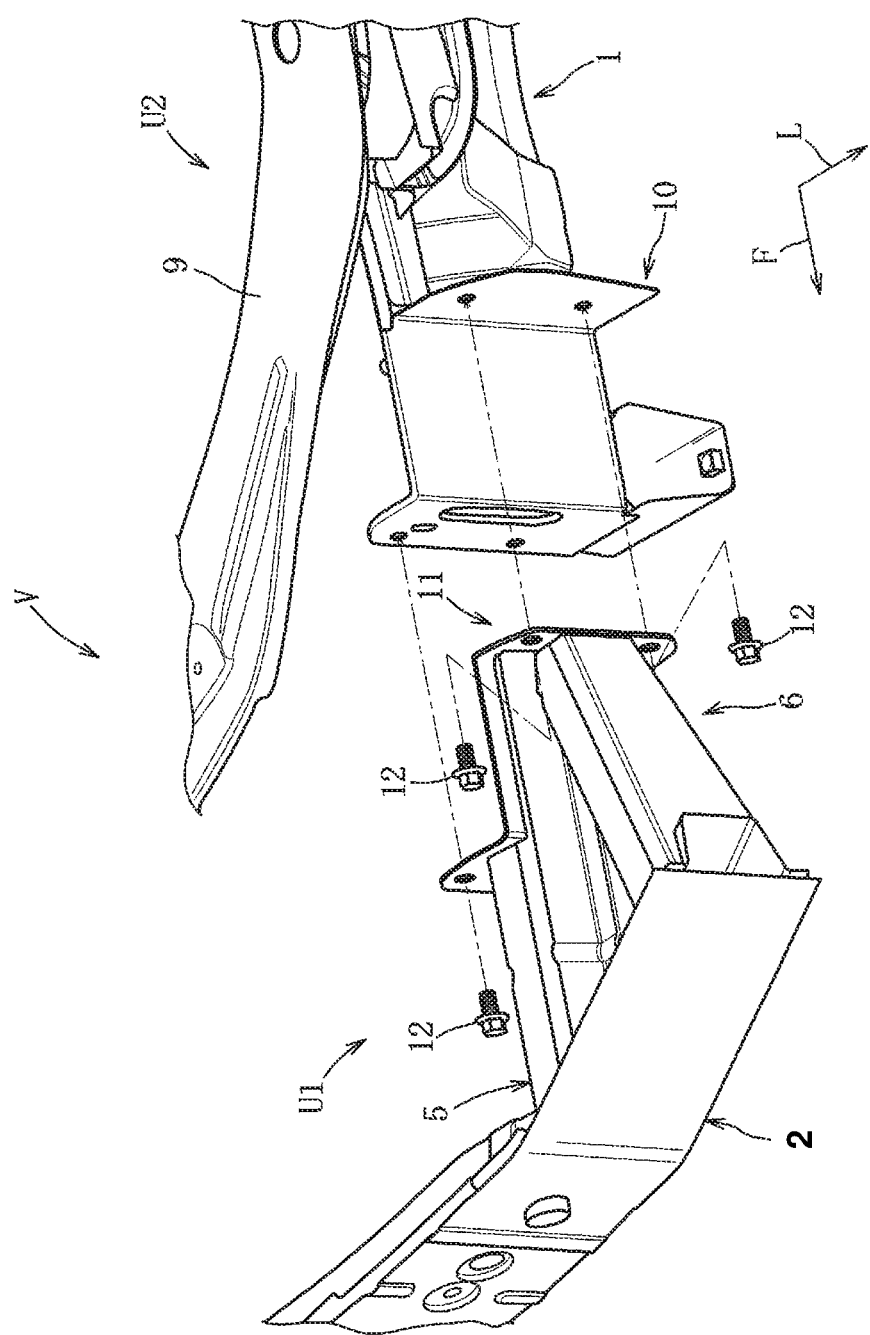
FIG. 16 is an explanatory diagram of an attachment step of a bumper-reinforcement side unit and a vehicle-body side unit.

The rear end portion of the outer panel 5*a* is joined to a front face portion of the rear end wall 11*c*, a rear-end side right end portion of the outer panel 5*a* is joined to a left face portion of the middle wall 11*a*, and the rear end portion of the inner panel 5*b* is joined to a front face portion of the front end wall 11*b*. The middle wall 11*a* is arranged in a face-contact state such that the middle wall 11*a* overlaps a left side of the middle wall 10*a*, and forms the outer panel portion of the front side frame jointly with the middle wall 10*a*. As shown in FIGS. 10 and 16, the second set plate 11 is capable of being fastened to the first set plate 10 with plural fastening bolts 12 (four bolts comprising a pair of upper-and-lower bolts and a pair of right-and-left bolts, for example) which are arranged longitudinally such that the second set plate 11 contacts the first set plate 10 which has a much-larger size than the second set plate 11.

As shown in FIG. 7, the pair of upper-and-lower bolts 12 located on the left side are configured such that the separation (offset) distance of these bolts 12 is greater than the vertical width of the front-end side portion of the connecting member 7, and are arranged at a specified position such that the front-end side portion of the connecting member 7 is located between these bolts 12. Accordingly, an attachment space of the bolts 12 is provided. Herein, the first set plate 10 and the second set plate 11 which is configured to be detachably attached to the first set plate 10 with the plural bolts 12 in the longitudinal direction correspond to the set plate of the present invention.

Next, the outside crash can 6 will be described. The outside crash can 6 is provided on the left side of the inside crash can 5, and configured to have a specified size and shape which can provide a desired impact-energy absorption performance through its compressive deformation when being crushed by the impact energy applied from an obliquely-front side via the bumper reinforcement 2. As shown in FIGS. 7-9, 11-15, the outside crash can 6 comprises an outer panel 6a having a U-shaped cross section and an inner panel 6b having a U-shaped cross section, and a top wall portion and a bottom wall portion of the outer panel 6a are respectively connected to a top wall portion and a bottom wall portion of the inner panel 6b. Thus, the outside crash can 6 has a roughly-rectangular closed cross section.

Figure 15:
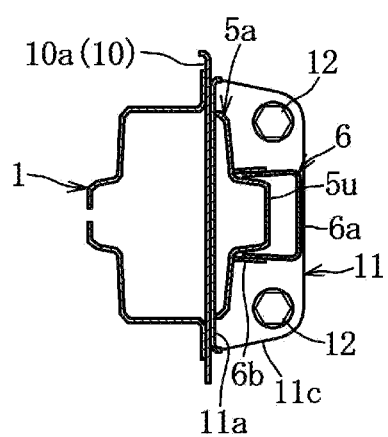
FIG. 15 is a sectional view taken along line XV-XV of FIG. 3.

A front end portion of the outside crash can 6 is connected to a left-end rear portion of the member portion 2b which is located leftward apart from a connection portion of the inside crash can 5 and the member portion 2b. Herein, the outside crash can 6 is connected to a vertical wall portion of the member portion 2b such that its axial center is perpendicular to this vertical wall portion. A rear-end side portion of the outside crash can 6 is connected to a rear-end side portion of the middle wall 11a and the rear end wall 11c, so that the outside crash can 6 extends obliquely forward and leftward in the plan view. As shown in FIGS. 3 and 7, a vertical width of the outside crash can 6 is set to become smaller toward the rear side. As shown in FIG. 15, a vertical width of a rear end portion of the outside crash can 6 is set to be slightly greater than a vertical width of the protrusion portion 5u formed at the left-side face of the inside crash can 5. Accordingly, the impact energy inputted to the outside crash can 6 is converged to the protrusion portion 5u having a high rigidity.

A rear end portion of the outer panel 6a is joined to a front face portion of the rear end wall 11c such that a left-side vertical wall portion of the outer panel 6a corresponds to the front end flange portion of the connecting member 7. Consequently, the impact energy inputted to the outside crash can 6 is dispersed and transmitted through a second path where the impact energy is transmitted to the front side frame 1 via the connection member 7, in addition to the first path where the impact energy is transmitted to the front side frame 1 via the protrusion portion 5u. As shown in FIGS. 8 and 9, the left-side vertical wall portion of the outer panel 6a is arranged substantially straightly with the connecting member 7 in the plan view, so that the second path where the impact energy inputted to the outside crash can 6 is straightly transmitted to the front side frame 1, having the shortest transmission distance, is provided.

A rectangular cutout (notch) 6c is formed at the rear-end side portion of the inner panel 6b. The rear-end side portion of the inner panel 6b is joined to a vertical wall portion of the protrusion portion 5u such that upper-and-lower wall portions of the protrusion portion 5u are vertically interposed in the rear-end side portion of the inner panel 6b, including upper-and-lower ridgelines of the protrusion portion 5u. Thereby, the impact energy inputted to the outside crash can 6 is converged to the protrusion portion 5u via the vertical wall portion, the upper wall portion, and the lower wall portion of the protrusion portion 5u. Thus, the rear-end side right end portion of the inner panel 6b is connected to the left face portion of the middle wall 11a (indirectly) via the outer panel 5a (the protrusion portion 5u) of the inside crash can 5, and the rear end portion of the inner panel 6b is connected to the front face portion of the rear end wall 11c (directly) by welding. The rear-end side portion of the protrusion portion 5u is stored in the closed cross section of the outside crash can 6.

Next, the assembling steps of the bumper reinforcement 2 will be described. As shown in FIG. 16, the pair of right-and-left inside crash cans 5 and the pair of right-and-left outside crash cans 6 are respectively connected to the bumper reinforcement 2, and a bumper-reinforcement side unit U1 in which the second set plates 11 are respectively welded to the rear end portions of the right-and-left crash cans 5, 6 is prepared. Herein, the rear-end side portion of each of the outside crash cans 6 is joined to the protrusion portion 5u formed at the outward face, in the vehicle width direction, of the inside crash can 5 such that the protrusion portion 5u is vertically interposed in the rear-end side portion of the outside crash can 6. Further, a vehicle-body side unit U2 in which the pair of right-and-left first set plates 10 are respectively welded to the pair of right-and-left front side frames 1 and the pair of right-and-left connecting frames 4 is prepared.

Next, after the bumper-reinforcement side unit U1 is moved to a position before the vehicle-body side unit U2, positioning of the first set plate 10 and the second set plate 11 is executed. After the positioning of the first set plate 10 and the second set plate 11, the bumper-reinforcement side unit U1 is attached to the vehicle-body side unit U2 with the respective bolts 12 fastened from the front. Accordingly, in a case in which the collision load is relatively small, such as in the light vehicle collision, the inside crash can 5 and/or the outside crash can 6 are crushed so as to absorb the impact energy, without breaking the front side frame 1, so that the bumper-reinforcement side unit U1 can be replaced easily.

Hereinafter, the operation and effects of the above-described front vehicle-body structure of the vehicle V will be described. According to the present front vehicle-body structure of the vehicle V, since there are provided the first and second set plates 10, 11 which connect the inside crash can 5 and the outside crash can 6 to the front side frame 1, the reparability and the productivity of the inside crash can 5 and the outside crash can 6 in the light vehicle collision can be ensured. Further, since the rear-end side portion of the inside crash can 5 is connected to the front end wall 11b and the rear end wall 11c of the inside crash can 5, the longitudinal length of the joint area can be ensured, so that the support strength of the inside crash can 5 can be increased. Since the rear-end side portion of the outside crash can 6 is connected to the middle wall 11a and the rear end wall 11c of the outside crash can 6, the longitudinal length of the joint area can be ensured, so that the support strength of the outside crash can 6 can be increased.

There are further provided the pair of right-and-left apron reinforcements 3 which are respectively provided above and outward of the pair of front side frames 1 and the pair of right-and-left connecting frames 4 which are provided to respectively connect the respective outward end portions, in the vehicle width direction, of the pair of front side frames 1 and the pair of apron reinforcements 3. Herein, the rear end wall 11c is connected to the front end portion of the connecting frame 4 via the rear end wall 10c. Accordingly, since the support strength of the set first and second set plates 10, 11 can be increased by using the connecting frame 4, the support strength of the inside crash can 5 and the outside crash can 6 can be further increased.

The front side frame 1 includes the panel-shaped outer panel 1a and the inner panel 1b which has the hat-shaped cross section, the outer and inner panels 1a, 1b forming the closed cross section together therewith, and the middle walls 10a, 11a form the front-end side portion of the outer panel 1a. Accordingly, since the impact energy in the vehicle frontal collision can be directly transmitted from the first and second set plates 10, 11 to the front end portion of the outer panel 1a, having the shortest distance, the transmission efficiency of the impact energy can be improved.

Further, since the connecting member 7 which connects the rear end walls 10c, 11c to the front side frame 1 is provided in the closed cross section of the connecting frame 4, the second path where the impact energy inputted to the outside crash can 6 is transmitted to the front side frame 1 via the connecting member 7 can be provided.

Since the left-side vertical wall portion of the outer panel 6a of the outside crash can 6 and the connecting member 7 are arranged substantially straightly in the plan view, the second path where the impact energy inputted to the outside crash can 6 is straightly transmitted to the front side frame 1, having the shortest transmission distance, can be provided.

Since the connecting member 7 is configured such that its vertical width becomes greater toward its rear side in the side view, the transmission efficiency of the impact energy to the front side frame 1 can be improved by dispersing the impact energy.

Moreover, since the inside crash can 5 is configured to have the cross section formed in the roughly cross shape by the four protrusion portions 5s-5v which extend longitudinally and formed at the upper, lower, inward, and outward side-face portions, the impact energy is properly transmitted to the inside crash can 5 regardless of the manner of collision, so that the uniform axial-compressive deformation by the inside crash can 5 can be attained. Further, since the outside crash can 6 is configured to have the cross section formed in the roughly rectangular shape such that its vertical width becomes smaller toward its rear side in the side view and its rear-end side portion is connected to the protrusion portion 5u which is formed at the outward side-face, in the vehicle width direction, of the inside crash can 5, the impact energy inputted to the outside crash can 6 can be converged to the protrusion portion 5u having the high rigidity and the converged impact energy can be transmitted to the front side frame 1 via the protrusion portion 5u.

Since the rear-end side portion of the outside crash can 6 is connected such that the protrusion portion 5u which is formed at the outward side-face, in the vehicle width direction, of the inside crash can 5 is vertically interposed in the rear-end side portion of the outside crash can 6, the impact energy inputted to the outside crash can 6 can be converged from the upper wall portion and the lower wall portion of the outside crash can 6 to the protrusion portion 5u, additionally to the side vertical-wall portion of the protrusion portion 5u.

There is provided the connecting member 7 which connects the rear end walls 10c, 11c and the front side frame 1, and the connecting member 7 is configured such that the vertical width of its front-end side portion is substantially equal to the vertical width of the rear-end side portion of the outside crash can 6. Accordingly, the impact energy inputted to the outside crash can 6 can be dispersed and transmitted through the first path where the impact energy is transmitted to the front side frame 1 via the protrusion portion 5u and the second path where the impact energy is transmitted to the front side frame 1 via the connecting member 7, so that the transmission efficiency of the impact energy can be further improved.

Next, partial modifications of the above-described embodiment will be described.

1) While the above-described embodiment described the example in which the first set plate is larger than the second set plate, these may be configured to have the same size as long as these set plates are capable of transmitting the impact energy. Further, the example in which the first and second set plates are configured to be fastened by two sets of fastening bolts comprising a pair of upper-and-lower bolts and a pair of right-and-left bolts, the number of the fastening bolts can be set arbitrarily depending on specifications as long as the set plates are detachable by using at least the fastening bolts which are arranged in the longitudinal direction.

2) While the above-described embodiment described the example in which the set plate comprises the first set plate and the second set plate which is detachable for the first set plate by using the plural bolts in the longitudinal direction, this set plate may comprise a sheet of set plate as long as the bumper-reinforcement side unit can be easily replaced by removing the set plate. In this case, a single set plate is provided at respective rear end portions of the inside crash can and the outside crash can which are attached to the bumper-reinforcement side unit, the front side frame and the connecting frame respectively have fastening portions for bolt fastening, and the set plate is fixedly fastened.

3) While the above-described embodiment described the example in which the first and second set plates form the front-end side portion of the outer panel of the front side frame, the front side frame may be configured such that its outer panel and its inner panel have the equal longitudinal length and the middle wall of the set plate may be arranged on the outward side, in the vehicle width direction, of the outer panel. In this case, the rear-end side portion of the outside crash can may be directly connected to both the rear-end side portion of the set-plate middle wall and the set-plate rear end wall.

4) While the above-described embodiment described the example in which the first and second set plates are configured to have the roughly crank-shaped cross section, the middle wall may be omitted so that the first and second set plates respectively comprise only the front end wall and the rear end wall. In this case, the outer panel and the inner panel of the front side frame have the equal longitudinal length.

5) While the above-described embodiment described the example in which the outside crash can is joined to the upper wall portion and the lower wall portion of the protrusion portion such that the upper wall portion and the lower wall portion of the protrusion portion formed at the outward side-face, in the vehicle width direction, of the inside crash can is vertically interposed in the outside crash can, the outside crash can may be connected to the vertical wall portion of the protrusion portion as long as it is joined to the protrusion portion.

6) The present invention should not be limited to the above-described embodiment, and any other modifications or improvements may be applied within the scope of a spirit of the present invention.

What is claimed is:

1. A front vehicle-body structure of a vehicle, comprising:
a bumper reinforcement extending in a vehicle width direction;
a pair of right-and-left front side frames supporting the bumper reinforcement via a pair of right-and-left inside crash cans;
a pair of right-and-left outside crash cans respectively provided on an outward side, in a vehicle width direction, of the pair of inside crash cans, the pair of outside crash cans being configured to respectively extend obliquely forward and outward from respective front-end side middle portions of the pair of front side frames and connect to respective outward end portions, in the vehicle width direction, of the bumper reinforcement; and
a pair of right-and-left set plates provided to respectively connect the pair of inside crash cans and the pair of outside crash cans to the pair of front side frames,
wherein each of said pair of set plates includes a set-plate middle wall which extends in a vehicle longitudinal direction, a set-plate front end wall which extends inward from a front end of the set-plate middle wall, and a set-plate rear end wall which extends outward from a rear end of the set-plate middle wall, a rear end-side portion of said inside crash can is connected to said set-plate front end wall and said set-plate rear end wall, and a rear-end side portion of said outside crash can is connected to said set-plate middle wall and said set-plate rear end wall.

2. The front vehicle-body structure of the vehicle of claim 1, further comprising:
a pair of right-and-left apron reinforcements respectively provided above and outward of said pair of front side frames; and
a pair of right-and-left connecting frames provided to respectively connect respective outward end portions, in the vehicle width direction, of said pair of front side frames and said pair of apron reinforcements,
wherein said set-plate rear end wall is connected to a front end portion of said connecting frame.

3. The front vehicle-body structure of the vehicle of claim 2, wherein said front side frame includes a panel-shaped outer panel and an inner panel, the inner panel having a hat-shaped cross section, the outer and inner panels forming a closed cross section together therewith, and said set-plate middle wall forms a front-end side portion of said outer panel.

4. The front vehicle-body structure of the vehicle of claim 2, wherein a connecting member which connects said set-plate rear end wall to said front side frame is provided in a closed cross section of said connecting frame.

5. The front vehicle-body structure of the vehicle of claim 4, wherein an outside wall portion of said outside crash can and said connecting member are arranged substantially straightly in a plan view.

6. The front vehicle-body structure of the vehicle of claim 5, wherein said connecting member is configured such that a vertical width thereof becomes greater toward a rear side thereof in a side view.

7. The front vehicle-body structure of the vehicle of claim 4, wherein said connecting member is configured such that a vertical width thereof becomes greater toward a rear side thereof in a side view.

8. The front vehicle-body structure of the vehicle of claim 4, wherein said inside crash can is configured such that four protrusion portions extending longitudinally are formed at upper, lower, inward, and outward side-face portions thereof so as to have a cross section formed in a roughly cross shape, said outside crash can is configured to have a cross section formed in a roughly rectangular shape such that a vertical width thereof becomes smaller toward a rear side thereof in a side view, a rear-end side portion of the outside crash can is connected to said protrusion portion formed at the outward side-face, in the vehicle width direction, of the inside crash can, there is provided a connecting member which connects said set-plate rear end wall and said front side frame, and said connecting member is configured such that a vertical width of a front-end side portion thereof is substantially equal to a vertical width of said rear-end side portion of the outside crash can.

9. The front vehicle-body structure of the vehicle of claim 1, wherein said front side frame includes a panel-shaped outer panel and an inner panel, the inner panel having a hat-shaped cross section, the outer and inner panels forming a closed cross section together therewith, and said set-plate middle wall forms a front-end side portion of said outer panel.

10. The front vehicle-body structure of the vehicle of claim 1, wherein said inside crash can is configured such that four protrusion portions extending longitudinally are formed at upper, lower, inward, and outward side-face portions thereof so as to have a cross section formed in a roughly cross shape, said outside crash can is configured to have a cross section formed in a roughly rectangular shape such that a vertical width thereof becomes smaller toward a rear side thereof in a side view, and a rear-end side portion of the outside crash can is connected to said protrusion portion formed at the outward side-face, in the vehicle width direction, of the inside crash can.

11. The front vehicle-body structure of the vehicle of claim 10, wherein there is provided a connecting member which connects said set-plate rear end wall and said front side frame, and said connecting member is configured such that a vertical width of a front-end side portion thereof is substantially equal to a vertical width of said rear-end side portion of the outside crash can.

* * * * *